UNITED STATES PATENT OFFICE.

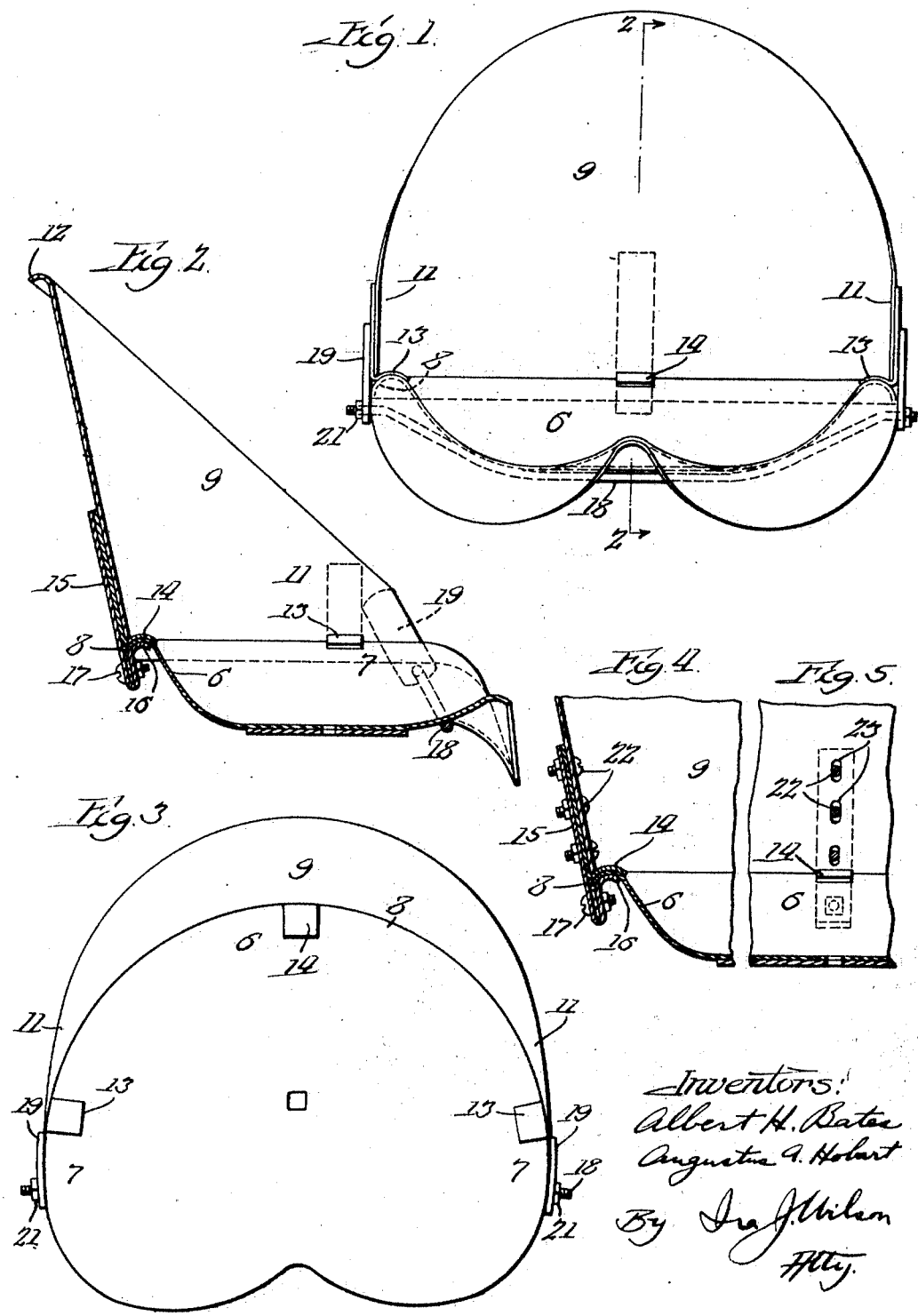

ALBERT HENRY BATES AND AUGUSTUS ANDREWS HOBART, OF MINNEAPOLIS, MINNESOTA; SAID BATES ASSIGNOR TO EMERSON BRANTINGHAM COMPANY, OF ROCKFORD, ILLINOIS, A CORPORATION OF ILLINOIS.

BACK-REST FOR DRIVERS' SEATS.

1,315,810.   Specification of Letters Patent.   Patented Sept. 9, 1919.

Application filed January 17, 1919. Serial No. 271,626.

*To all whom it may concern:*

Be it known that we, ALBERT HENRY BATES and AUGUSTUS ANDREWS HOBART, citizens of the United States, residing at Minneapolis, in the county of Hennepin and State of Minnesota, have invented certain new and useful Improvements in Back-Rests for Drivers' Seats, of which the following is a specification.

This invention pertains to back rests for seats, and has more particular reference to that class of back rests especially adapted for drivers' seats of the kind generally used on agricultural implements, tractors, and the like. This type of seat is well known and generally is of sheet metal construction having substantially semi-circular back and side portions, the rim of which is flanged or rolled.

The principal object of the present invention is to provide as a new article of manufacture, a simple and comparatively inexpensive back rest especially adapted for attachment to implement seats to make the riding more easy and comfortable.

We have also aimed to provide a back rest of such novel and practical design that it it adapted for attachment to any ordinary implement seat regardless of variations in dimensions thereof. To this end we have devised a back rest formed preferably of sheet metal and essentially U-shaped so as to conform to and accommodate the curved back and sides of an implement seat. We have also aimed to roll or flange the top of this back rest to lend to the comfort of its usage.

While the fastening means for attaching a back rest of this kind to an implement seat may be widely varied within the scope of the present invention, it is also an important object of our invention to provide in combination with the seat, fastening means which will permit of quick and ready attachment of the back rest to and removal of the same from a seat, and which will hold the back rest securely and firmly in connection with the seat. In this respect, we have designed a type of fastening peculiarly and effectively adapted to secure a back rest of generally U-shape to a seat. The fastening means not only clamps and accommodates the back rest to the seat irrespective of differences in dimensions of the latter, but also functions very effectively in taking the thrust or strain on the back rest when the operator leans back against it.

Other objects and attendant advantages will be appreciated as the invention becomes better understood by reference to the following description when considered in connection with the accompanying drawings, in which—

Figure 1 is a front elevation of an implement seat equipped with a back rest embodying our improvements;

Fig. 2, a vertical sectional view through the seat and back rest taken on the line 2—2 of Fig. 1;

Fig. 3, a plan view of the seat and back rest;

Fig. 4, an enlarged fragmentary view in section similar to Fig. 2 showing alternate fastening means; and Fig. 5 a front view of the fastening means shown in Fig. 4 with the heads of the bolts removed.

The type of seat that our improvements are best adapted for is generally known as an implement seat because of its use on almost every kind of agricultural implement, tractor, etc. A seat of this kind is characterized as shown in the drawings, by its low curved back 6 and side portions 7 having a peripheral flange or rolled edge 8. A suitable standard (not shown) supports the seat from the implement.

We have designed to provide a back rest having a body 9 formed preferably of sheet metal or from other flat material to extend around the back of the seat and forwardly substantially to the front thereof. This body constitutes the back rest proper and being of general U shape, is adapted to conform to the back and sides of a seat regardless of reasonable variations in size and shape thereof. That is, because of the general shape of the back rest body and the flexibility of its side portions 11 as regards movement of the latter toward and from each other, the body can be fitted and accommodated to practically any implement seat, for in attaching the back rest the side portions 11 will be sprung out or in, as the case may be, and the body 9 will conform to the particular contour of the seat rim. The top edge of the back rest body is preferably flanged or rolled as indicated by the character 12 in Fig. 2 to reinforce the back and also to provide a rounded edge which will not injure the operator when leaning against it. The body 9 seats or rests upon the flanged or peripheral edge or adjacent portions of the seat, and for this purpose is equipped with a plurality of feet 13 and 14 disposed at the sides and medial portion of the back respectively. These parts 13 and 14 may be suitably arranged and are at present in the form of metal clips welded or otherwise suitably secured to the body 9. This body is also equipped with one or more fastening elements adapted to engage beneath the flange 8 of the seat in a clamping action for holding the back rest against vertical displacement with respect to the seat. In the present instance, such fastening means consists of a clip 15 having an upturned end 16 adapted to engage beneath the flange 8 and to be clamped thereto by means of a bolt 17 passing through the lapped portions of the clip. While this fastening means is shown only in connection with the intermediate clip 14, it should be understood that it may be arranged on the back rest body to suit. In this respect, our invention contemplates a back rest body equipped with suitable fastening parts removably seated on the peripheral edge of the seat and other fastening means adapted to be forced or drawn into clamping engagement with the underside of the seat or seat flange.

Means are now provided for drawing the sides 11 of the back rest together into proper coöperation with the sides of the seat and for effectively securing these sides 11 and the back rest proper to the seat in a manner to prevent the back rest from tilting backward when the operator leans or presses against it. This means in its preferred form consists of a tie rod 18 extending beneath and across the seat from side to side thereof and connected with the sides 11 of the back rest as by passing through apertures in depending extension clips 19 fixed to said sides and being equipped on the outer side of said clips with nuts 21 adapted to be tightened for drawing the tie rod and said sides tight against the seat. It will be manifest by reason of this arrangement that the sides 11 of the back rest can be very quickly and easily accommodated and substantially secured in proper relation to the seat and that the tie rod functions very effectively for resisting the back thrust on the back rest.

In Figs. 4 and 5, we have shown the fastening clips 14 and 15 adjustable toward and from the seat flange 8 so as to accommodate variations in size and shape of different implement seats. Such adjustment is effected in a practical way by passing the fastening bolts 22 through vertical slots 23 in the body 9.

It is believed that the foregoing illustrates clearly the manner in which the objects prefaced above are accomplished, and it should be understood that while we have shown and described but the preferred embodiment of our improvement, various changes might be made in the construction and arrangement without departing from the spirit and scope of the invention as expressed in the appended claims, in which, we claim:

1. As a new article of manufacture, a back rest adapted for attachment to an implement seat having curved back and sides, comprising a body of general U-shape conforming to the curved back and sides of the seat, and means joining and operative between the sides of the back rest for drawing said sides inwardly to clamp them to the sides of the seat.

2. As a new article of manufacture, a back rest adapted for attachment to an implement seat having a flanged rim, comprising a back rest body equipped with means adapted to rest on the top of said seat flange at the sides and back of the seat and means adapted to engage beneath the seat flange at the back of the seat, and other means extending beneath the seat connected with the sides of the back rest body for clamping the same to the seat.

3. The combination of an implement seat having a flanged rim, a back rest body of general U-shape having parts associated with said rim for holding the body against vertical displacement with respect to the seat, and a tie rod extending beneath the seat from side to side thereof and connected with the sides of the back rest for clamping the latter to the seat.

4. The combination of an implement seat having a flanged rim, a back rest body of general U shape having parts associated with said rim for holding the body against vertical displacement with respect to the seat, said parts being adjustable on the back rest body toward and from the seat flange to accommodate variations in flange constructions, and means for rigidly securing the back rest body to the seat.

5. The combination of an implement seat, a back rest body detachably mountable upon said seat, and a tie rod extending beneath the seat from side to side thereof and connected with the adjacent side portions of the back rest body for clamping the latter to the seat.

6. The combination of a seat of the agricultural implement type having curved back and sides and a flanged rim thereabout, a back rest body conforming to the shape of said back and sides and equipped with supporting means seated on the top of said flange and engaging beneath the flange, and other means for clamping and rigidly securing the sides of the back rest body to and in connection with the seat.

7. The combination of a seat, a back rest body conforming in general to the back and sides of the seat and removably mounted thereon, and a tie bolt extending beneath the seat from side to side thereof and connected with the sides of the back rest body for clamping the latter to the seat.

8. As a new article of manufacture, a back rest adapted for attachment to a seat having a back and sides of general U-shape, comprising a back rest body of general U-shape, and means for detachably connecting the back rest body to the seat including means extending beneath the seat for drawing the side portions of said body inwardly into coöperation with the seat.

ALBERT HENRY BATES.
AUGUSTUS ANDREWS HOBART.

Copies of this patent may be obtained for five cents each, by addressing the "Commissioner of Patents, Washington, D. C."